United States Patent

Nakamura et al.

(10) Patent No.: US 7,418,315 B2
(45) Date of Patent: Aug. 26, 2008

(54) POWER GENERATION SYSTEM

(75) Inventors: Akinari Nakamura, Katano (JP);
Masataka Ozeki, Izumi (JP); Yoshikazu Tanaka, Kyoto (JP); Takashi Nishikawa, Tenri (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 100 days.

(21) Appl. No.: 10/565,476

(22) PCT Filed: Jul. 23, 2004

(86) PCT No.: PCT/JP2004/010876

§ 371 (c)(1),
(2), (4) Date: Jan. 20, 2006

(87) PCT Pub. No.: WO2005/011033

PCT Pub. Date: Feb. 3, 2005

(65) Prior Publication Data

US 2006/0188764 A1 Aug. 24, 2006

(30) Foreign Application Priority Data

Jul. 25, 2003 (JP) ............................. 2003-279837

(51) Int. Cl.
*H02J 3/00* (2006.01)
*G05B 11/01* (2006.01)
*H01M 8/00* (2006.01)
*H01M 8/04* (2006.01)

(52) U.S. Cl. ...................... 700/296; 700/287; 700/292; 429/22

(58) Field of Classification Search ................. 700/292, 700/286, 287, 295–297; 429/30, 22; 324/66
See application file for complete search history.

(56) References Cited

U.S. PATENT DOCUMENTS 5,561,330 A * 10/1996 Crook ....................... 290/30 R
6,904,337 B2 * 6/2005 Ueda et al. ................. 700/295
2003/0215681 A1   11/2003 Appt et al.

FOREIGN PATENT DOCUMENTS

JP   2000-299116 A   10/2000

(Continued)

*Primary Examiner*—Ryan A. Jarrett
*Assistant Examiner*—Steven R Garland
(74) *Attorney, Agent, or Firm*—Panitch Schwarze Belisario & Nadel LLP

(57) ABSTRACT

A power generation system (200) of the present invention comprises a power generation portion (202) configured to generate power, a load power detecting means (205) configured to detect a load power supplied from a power source including the power generation portion to a load, an operation stop determination means (209) configured to stop a power generation operation of the power generation portion based on the load power detected by the load power detecting means and a stop condition; and a stop condition setting means (220) configured to set the stop condition, wherein the stop condition setting means sets different stop conditions in a plurality of time periods, and wherein the operation stop determination means stops the power generation operation of the power generation portion based on each of the different stop conditions set by the stop condition setting means and the load power detected by the load power detecting means.

16 Claims, 7 Drawing Sheets

FOREIGN PATENT DOCUMENTS

| | | |
|---|---|---|
| JP | 2002-198079 A | 7/2002 |
| JP | 2002-352834 A | 12/2002 |
| JP | 2003-197233 A | 7/2003 |
| JP | 2003-235162 A | 8/2003 |
| JP | 2003-303605 A | 10/2003 |
| JP | 2003-329292 A | 11/2003 |
| JP | 2004-103397 * | 4/2004 |
| JP | 2004-103397 A | 4/2004 |
| WO | WO02/29953 * | 4/2002 |

* cited by examiner

POWER GENERATION SYSTEM

CROSS-REFERENCE TO RELATED APPLICATION

This application is a section 371 of International Application No. PCT/JP2004/010876, filed Jul. 23, 2004, which was published in the Japanese language on Feb. 3, 2005, under International Publication No. WO 2005/011033 A1 and the disclosure of which is incorporated herein by reference.

TECHNICAL FIELD

The present invention relates to a power generation system and an operation method thereof and, particularly to a fuel cell system configured to generate power using a fuel cell and an operation method thereof.

BACKGROUND ART

Traditionally, a fuel cell system capable of highly efficient and small-scale power generation easily constructs a system for utilizing a heat energy generated during power generation and achieves high energy utilization efficiency. Therefore, the fuel cell system is suitably used as a distributed power generation system.

The fuel cell system comprises a fuel cell which is a base portion of a power generation portion. As the fuel cell, for example, a polymer electrolyte fuel cell or a phosphoric acid fuel cell is typically employed. In these fuel cell systems, a hydrogen-rich gas containing plenty of hydrogen (hereinafter referred to as a fuel gas) and air (hereinafter referred to as an oxidizing gas) are used to generate power. To this end, the fuel cell system is equipped with a fuel processor configured to generate the fuel gas required for power generation. In the fuel processor, for example, a natural gas supplied from a natural gas supply means or the like goes through a steam reforming reaction and is converted into hydrogen, thus generating the fuel gas containing plenty of hydrogen. In this case, a reaction space in which the steam reforming reaction takes place in the fuel processor is heated up to and kept at a predetermined temperature by heat resulting from combustion of, for example, the natural gas.

In an operation of the conventional power generation system including the fuel cell system, in order to inhibit wasteful consumption of the fuel gas or the like used in power generation, it is desirable to properly control the supply amount of the fuel gas or the like to the fuel cell or the like according to a power consumption of a power load such as electronic equipment (hereinafter referred to as a power load) connected to the power generation system. In other words, in the fuel cell system, in order to inhibit wasteful consumption of the natural gas or the like used to generate the fuel gas, it is desirable to properly control the amount of the natural gas supplied to a fuel reformer according to the power consumption of the power load. Accordingly, there has been disclosed a power generation system in which power resulting from power generation and commercial power are used together in a time period in which the power consumption of the power load connected to the power generation system is large in amount, while the power generation is stopped and only the commercial power is supplied in a time period in which the power consumption of the power load is small in amount (e.g., Japanese Laid-Open Patent Application Publication No. 2000-299116). In addition, there has been disclosed a power generation system in which when the power consumption of the power load is not less than a predetermined threshold, an output power is controlled according to a variation in the power consumption of the power load detected by a load power detecting means, while when not more than the predetermined threshold, the power generation operation is stopped (e.g., Laid-Open Patent Application Publication No. 2002-352834). According to these disclosures, since the consumption amount of the feed material such as the natural gas, required for power generation is properly controlled according to the power consumption of the power load, it is possible to construct a suitable power generation system with higher energy utilization efficiency.

Hereinafter, a construction and operation patterns of the conventional fuel cell system will be described with reference to the drawings.

FIG. 6 is a block diagram schematically showing a construction of the conventional fuel cell system.

As shown in FIG. 6, a conventional fuel cell system 100 comprises a fuel cell 100a configured to generate power using a fuel gas and an oxidizing gas, an output control means 100b configured to control an output power of the fuel cell 100a and to control start-up and stop of a power generation operation of the fuel cell 100a, a load power detecting means 100c configured to detect a power consumption of a power load 100e described later and to output a control signal necessary for, for example, the output control means 100b to control the output power of the fuel cell 100a, and a storage battery 100d configured to store excess output power. The storage battery 100d is electrically connected to a connecting portion between the output control means 100b and the load power detecting means 100c. In addition, a commercial power 100f is connected to the connecting portion. The power load 100e, such as electronic equipment, is configured to consume the power output from the fuel cell system 100 and is connected to the load power detecting means 100c.

In the conventional fuel cell system 100 of FIG. 6, a fuel gas generated in a fuel gas generation means such as a fuel processor which is not shown in FIG. 6 and an oxidizing gas are supplied to the fuel cell 100a. Using the fuel gas and the oxidizing gas, the fuel cell 100a generates power. The output power resulting from power generation in the fuel cell 100a is supplied to the power load 100e through the output control means 100b and the load power detecting means 100c. The power load 100e consumes the power supplied from the fuel cell system 100. At this time, excess output power is stored in the storage battery 100d. When the output power of the fuel cell 100a is insufficient for the power consumption of the power load 100e, the commercial power 100f makes up for the deficiency.

An example of an operation pattern during a day regarding the power generation operation in the conventional fuel cell system will be described in detail.

FIG. 7 is a view schematically showing an operation pattern during a day of the conventional fuel cell system. In FIG. 7, an ordinate axis indicates a power axis and an abscissa axis indicates a time axis.

In FIG. 7, a curve 111 indicates a time lapse variation in the power consumption of the power load 100e, and a curve 112 indicates a time lapse variation in the output power of the fuel cell 100a. In FIG. 7, a maximum output power W1c indicates a maximum value of the power that is capable of being output from the fuel cell 100a, and a minimum output power W1d indicates a minimum value of the power that is capable of being output from the fuel cell 100a.

As illustrated by the curve 111 of FIG. 7, typically, the power consumption at general home in a first time period 101a from about 0:00 at midnight until about 5:00 in early morning is small in amount, but is large in amount in a second time period 101b that elapses from when users wake up until about 13:00 when household tasks may be finished. The power consumption is small in amount in a third time period 101c from about 13:00 until about 17:00 because of a decrease in the number of power loads 100e that are in operation, but is large in amount in a fourth time period 101d from about 17:00 until about 23:00 because of an increase in the number of the power loads 100e that are in operation. The power consumption in a fifth time period 101e after the users go to sleep is small in amount as in the power consumption in the first time period 101a.

The fuel cell 100a in the conventional fuel cell system 100 outputs power as indicated by the curve 112 of FIG. 7 in response to the variation in power consumption during a day. Specifically, when the load power detecting means 100c of the fuel cell system 100 detects that the power consumption of the power load 100e is above an operation start power threshold W1a which is a preset threshold at which the fuel cell 100a starts a power generation operation for a predetermined time period T1a or more in the first time period 101a in FIG. 7, the power generation operation of the fuel cell 100a is started-up (first start-up). The fuel cell 100a starts to output power as indicated by the curve 112 after an operation preparation time period Ts in which, for example, a fuel gas is generated in a fuel processor or the like. When the power output of the fuel cell 100a becomes substantially equal to the power consumption of the power load 100e in the second time period 101b, the output control means 100b controls the output power of the fuel cell 100a between the maximum output power W1c and the minimum output power W1d according to the variation in the power consumption of the power load 100e which is detected by the load power detecting means 100c. At this time, if the power consumption of the power load 100e is above the output power of the fuel cell 100a, the commercial power 100f makes up for the deficiency. As illustrated by the third time period 101c, when the power consumption of the power load 100e is below an operation stop power threshold W1b for a predetermined time period T1b or more, the output control means 100b stops the power generation operation of the fuel cell 100a. At this time, the operation for generating the fuel gas in the fuel processor or the like is stopped. In a stopped state of the power generation operation in the fuel cell 100a, the commercial power 100f supplies the power to the power load 100e.

As illustrated by the third time period 101c, when the load power detecting means 100c of the fuel cell system 100 detects that the power consumption of the power load 100e is above the operation start power threshold W1a for the predetermined time period T1a or more, the power generation operation of the fuel cell 100a is re-started-up (second start-up). As in the first start-up, the fuel cell 100a re-starts to output the power as indicated by the curve 112 after the operation preparation time period Ts. As in the second time period 101b, as illustrated by the fourth time period 101d, the output control means 100b controls the output power of the fuel cell 100a between the maximum output power W1c and the minimum output power W1d according to the variation in the power consumption of the power load 100e which is detected by the load power detecting means 100c.

As illustrated by the fifth time period 101e, when the power consumption of the power load 100e is below the operation stop power threshold W1b for the predetermined time period T1b or more again, the output control means 100b stops the power generation operation of the fuel cell 100a again. As in the third time period 101c, at this time, the operation of the fuel processor or the like is stopped. In this case, the commercial power 100f supplies the power to the power load 100e.

As should be appreciated, in the conventional fuel cell system 100, the output power of the fuel cell 100a is controlled according to the variation in the power consumption of the power load 100e. When the power consumption of the power load 100e transitions from a large amount state in, for example, the second time period 101b, to a small amount state in, for example, the third time period 101c, and the power consumption of the operation stop power threshold W1b or less continues for the predetermined time period T1b or more, the power generation operation of the fuel cell 100a and the operation of the fuel processor or the like are stopped.

However, in the above described conventional fuel cell system 100, when the power generation operation of the operation pattern illustrated in FIG. 7 is performed, wasteful consumption of the natural gas or the like occurs because of the second start-up. More specifically, in the conventional fuel cell system 100, the start-up of the fuel cell 100a, the fuel processor or the like is performed twice during a day, like the first start-up and the second start-up. It is important that, in stopping the power generation operation of the fuel cell 100a during a relatively long time period, for example, in a range from the fifth time period 101e to the first time period 101a, the operations of the fuel cell 100a, the fuel processor and the like be stopped in order to increase energy utilization efficiency. However, when the power generation operation of the fuel cell 100a is stopped during a relatively short time period as illustrated by the third time period 101c, the energy required to start-up the fuel cell 100a, the fuel processor, or the like is more than the energy consumed by continuing the power generation operation of the fuel cell 100a. In other words, when the power consumption of the power load 100e is less for a relatively short time period, a total energy utilization efficiency increases by continuing the power generation operation of the fuel cell 100a. According to this, since the natural gas or the like is wastefully consumed to start-up the fuel cell 100a, the fuel processor, or the like, which is believed to be unnecessary, the total energy utilization efficiency decreases. As compared to other power generation systems, for example, an engine power generation system or the like, such unnecessary start-up operation increases wasteful power consumption in the fuel cell system that reforms a feed material such as the natural gas (city gas) to generate the fuel gas, because of its longer time period of the start-up operation, and as a result, the total energy utilization efficiency decreases.

DISCLOSURE OF THE INVENTION

The present invention is directed to solving the above described problems associated with the prior arts, and an object of the present invention is to provide a power generation system with high energy utilization efficiency, which is capable of inhibiting unnecessary stop of a power generation operation by changing a condition for determining whether or not to stop an operation of a power generation portion according to an activity cycle of users and of thereby decreasing wasteful energy power consumption, and an operation method thereof.

In order to achieve the above mentioned object, a power generation system of the present invention comprises a power generation portion configured to generate power; a load power detecting means configured to detect a load power which is supplied from a power source including the power generation portion to a load; an operation stop determination means configured to stop a power generation operation of the power generation portion based on the load power detected by the load power detecting means and a stop condition; and a stop condition setting means configured to set the stop condition, wherein the stop condition setting means sets different stop conditions in a plurality of time periods, and wherein the operation stop determination means stops the power generation operation of the power generation portion based on each of the different stop conditions set by the stop condition setting means and the load power detected by the load power detecting means. In such a configuration, since individual stop conditions which are suitable for the respective time periods are defined, it is possible to inhibit unnecessary stop of the power generation system in a time period in which power generation is necessary and unnecessary operation of the power generation system in a time period in which power generation is unnecessary.

The time periods include two time periods into which one day is divided, the two time periods including at least 2:00 and at least 14:00, respectively. The time periods include three time periods into which one day is divided, the three time periods including at least 2:00, at least 10:00, and at least 18:00, respectively. The time periods include four time periods into which one day is divided, the four time periods including at least 2:00, at least 8:00, at least 14:00, and at least 20:00, respectively. In such a configuration, since one day is divided in two, three or four using 2:00 at which power demand is typically less as a reference, it is effectively determined whether or not the power generation operation in the power generation portion is stopped in the two, three, or four time periods.

The time periods and the stop conditions are pre-set. In such a configuration, since the time periods and the stop conditions are pre-set, unnecessary operation of the power generation system is inhibited using a simple configuration. As used herein, the state "in which the time periods and the stop conditions are pre-set" refers to a state in which the time periods and the stop conditions are set as initial values when the power generation system is delivered.

The power generation system further comprises an input means with which at least the time periods and the stop conditions are input, and the stop condition setting means sets the time periods and the stop conditions which have been input with the input means. In such a configuration, since the user or the like of the power generation system sets the time periods and the stop condition as desired, unnecessary operation of the power generation system is effectively inhibited.

The power generation system further comprises a learning means configured to learn at least the time periods and the stop conditions based on stored data of the load power which is detected by the load power detecting means, and the stop condition setting means sets the time periods and the stop conditions which have been obtained by the learning means. In such a configuration, various power demands are met using the time periods and the stop condition which have been obtained by learning based on stored data, it is possible to effectively inhibit unnecessary stop of the power generation system, and to inhibit unnecessary operation of the power generation system in the time period in which the power generation is unnecessary.

The stop condition includes at least one of a power condition, a time condition, and a frequency condition, and the at least one condition is set to have different values in the plurality of time periods. In such a configuration, it is possible to effectively inhibit unnecessary stop of the power generation system in the time period in which power generation is necessary, and to inhibit unnecessary operation of the power generation system in the time period in which the power generation is unnecessary.

In the above case, the power condition includes an instantaneous power threshold or an integrated power threshold. In such a configuration, the operation of the power generation system can be controlled for any of the instantaneous power and the integrated power.

In this case, the instantaneous power threshold or the integrated power threshold is set according to an average value of the load power in each of the time periods. In such a configuration, by setting, larger, a power condition corresponding to a stop condition in a time period of, for example, two time periods, in which an average power is larger, it is possible to inhibit unnecessary stop of the power generation system in the time period in which the average power is larger and power generation is necessary. In addition, it is possible to inhibit unnecessary operation of the power generation system in the time period in which the average power is smaller and the power generation is unnecessary.

In the above case, the time condition is a time in which the load power meets the power condition. In such a configuration, the operation of the power generation system can be suitably controlled.

In this case, the time is set according to an average value of the load power in each of the time periods. In such a configuration, by setting, longer, a time condition corresponding to a stop condition in a time period of, for example, two time periods, in which an average power is larger, it is possible to inhibit unnecessary stop of the power generation system in the time period in which the average power is larger and power generation is necessary. In addition, it is possible to inhibit unnecessary operation of the power generation system in the time period in which the average power is smaller and the power generation is unnecessary.

In the above case, the frequency condition is a frequency at which the load power meets the power condition. In such a configuration, the operation of the power generation system can be suitably controlled.

In this case, the frequency is set according to an average value of the load power in each of the time periods. In such a configuration, by setting, larger, a frequency condition corresponding to a stop condition in a time period of, for example, two time periods, in which an average power is larger, it is possible to inhibit unnecessary stop of the power generation system in the time period in which the average power is larger and the power generation is necessary. In addition, it is possible to inhibit unnecessary operation of the power generation system in the time period in which the average power is smaller and the power generation is unnecessary.

The power generation portion is a fuel cell configured to generate power using a fuel gas containing plenty of hydrogen and an oxidizing gas containing oxygen, and the power generation system further comprises a fuel processor configured to generate the fuel gas through a steam reforming reaction of a hydrocarbon material and water; and an air blower configured to supply air which is the oxidizing gas to the fuel cell. In such a configuration, the fuel cell system including the fuel processor requires longer time for start-up and stop as compared to other power generating systems (e.g., engine power generation system, etc). Accordingly, by inhibiting unnecessary stop of the power generation system and by inhibiting unnecessary operation of the power generation system in the time period in which power generation is unnecessary, unnecessary energy consumption is reduced. As a result, it is possible to achieve a power generation system with higher efficiency.

A method of operating a power generation system of the present invention, including a power generation portion configured to generate power; and a load power detecting means configured to detect a load power which is supplied from a power source including the power generation portion to a load; comprising the steps of: setting different stop conditions in a plurality of time periods; and stopping a power generation operation of the power generation portion based on the different stop conditions and the load power detected by the load power detecting means. In such a configuration, since individual stop conditions which are suitable for the respective time periods are defined, it is possible to inhibit unnecessary stop of the power generation system in the time period in which the power generation is necessary, and to inhibit unnecessary operation of the power generation system in the time period in which the power generation is unnecessary.

The above and further objects and features of the invention will be more fully be apparent from the following detailed description with accompanying drawings.

BEST MODE FOR CARRYING OUT THE INVENTION

Hereinafter, embodiments of the present invention will be described with reference to the drawings. Herein, by way of example, a fuel cell system will be described.

Embodiment 1

A first embodiment of the present invention illustrates that a power threshold condition associated with a power generation operation of a fuel cell is varied according to a use status of a fuel cell system.

First of all, a construction of the fuel cell system according to the first embodiment of the present invention will be described with reference to the drawings.

Figure 5:
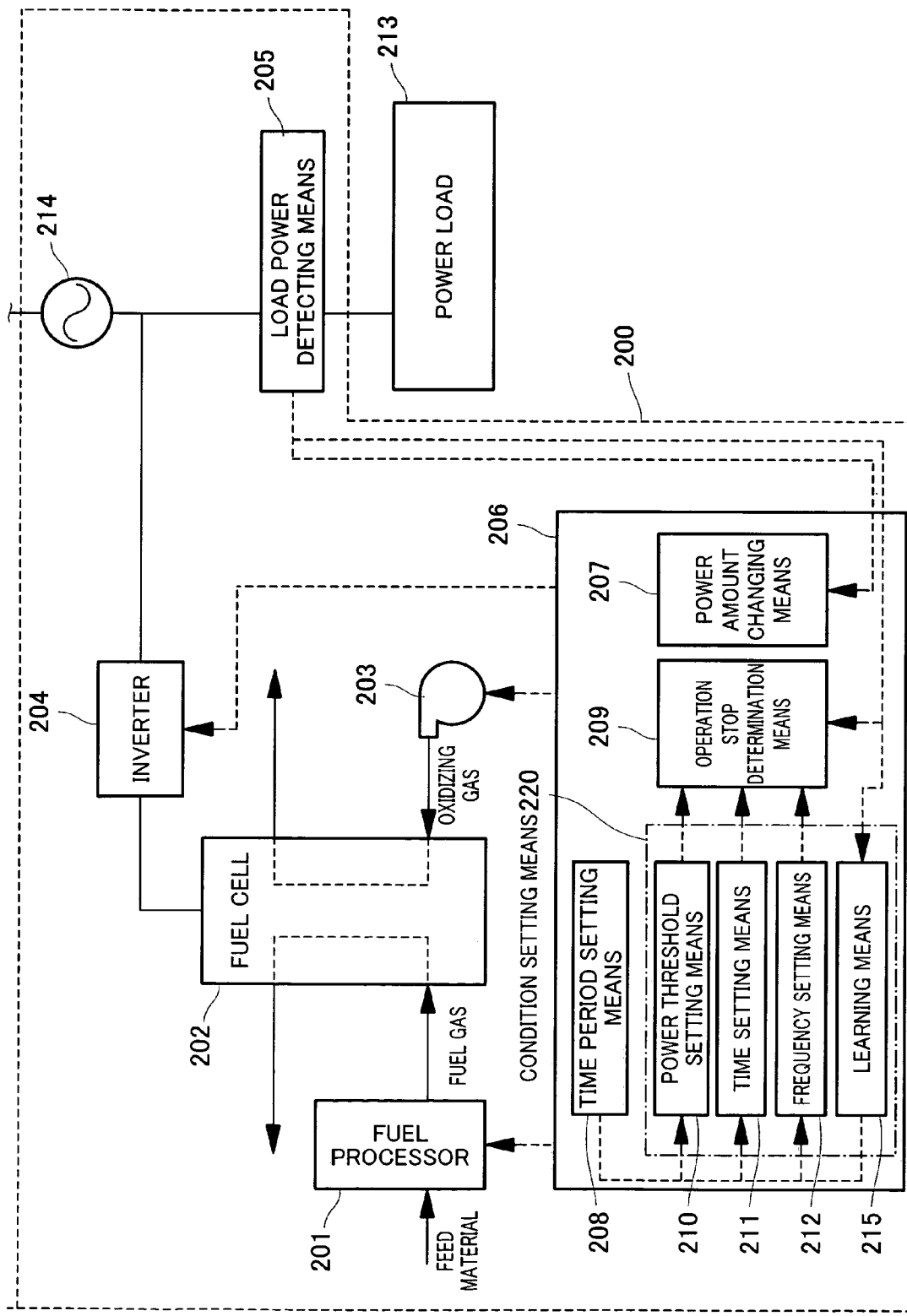
FIG. 5 is a block diagram schematically showing a construction of the fuel cell systems according to the first to fourth embodiments of the present invention.
Figure 6:
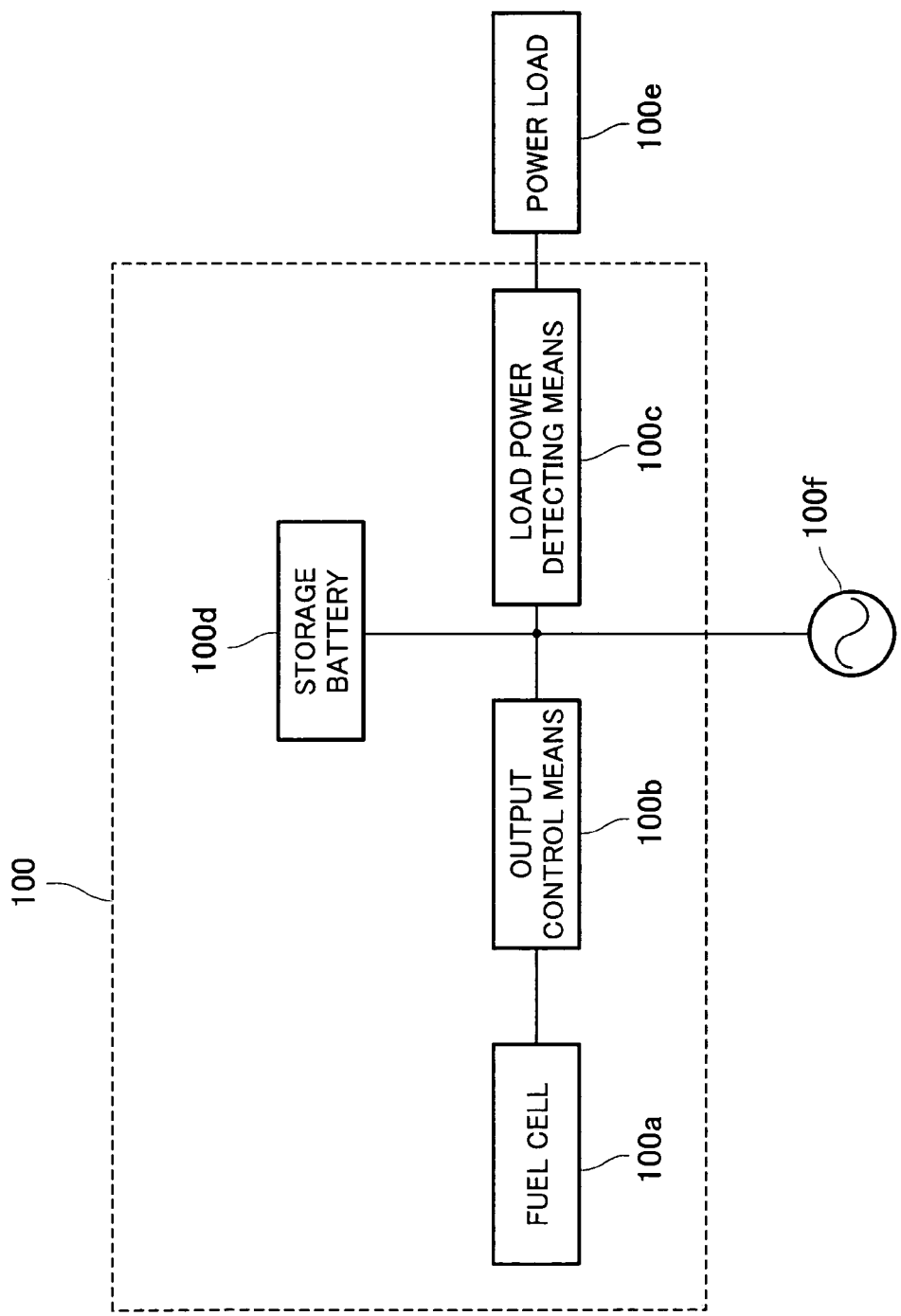
FIG. 6 is a block diagram schematically showing a construction of the conventional fuel cell system.
Figure 7:
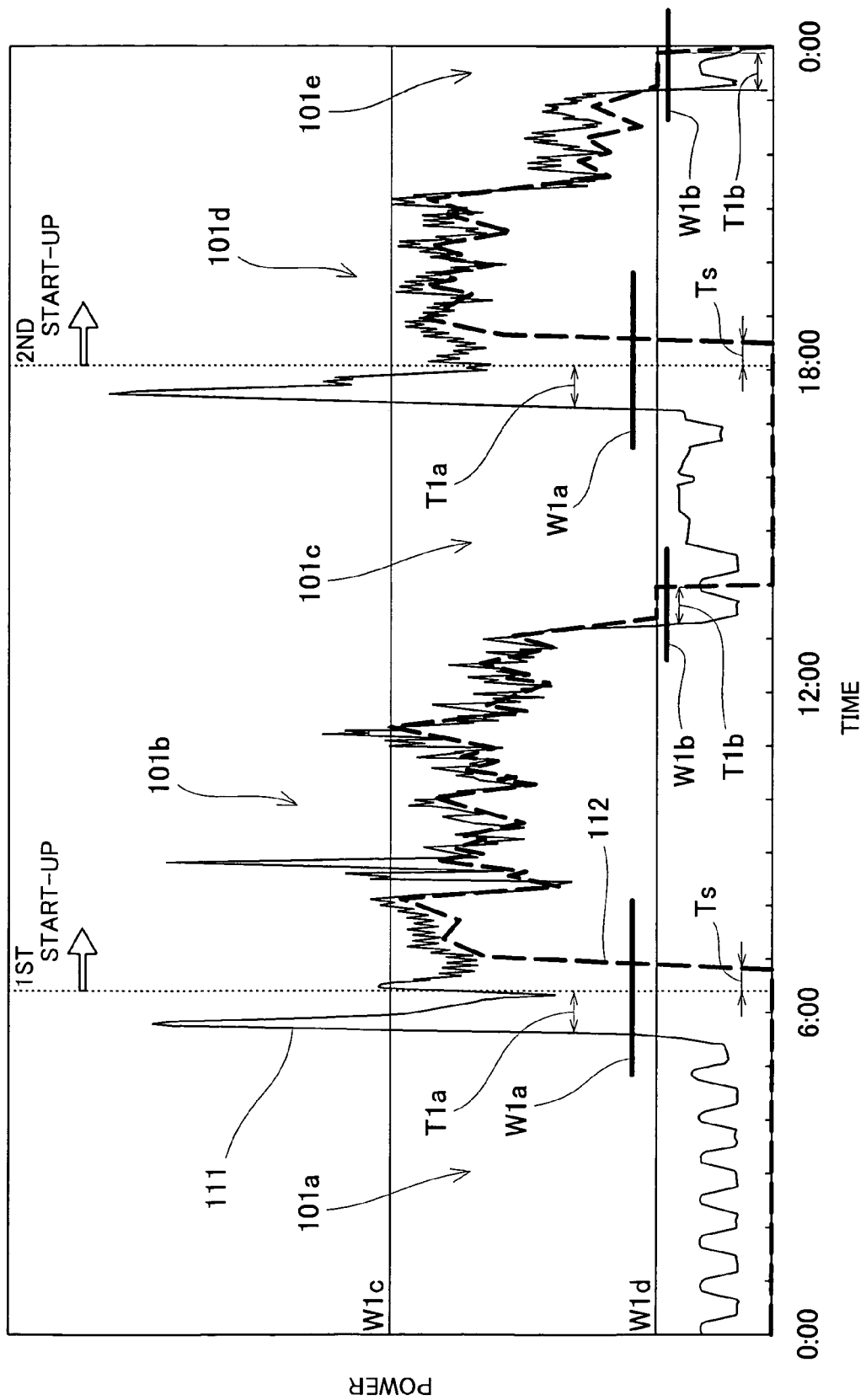
FIG. 7 is a view schematically showing an example of an operation pattern of the conventional fuel cell system.

FIG. 5 is a block diagram schematically showing the construction of the fuel cell system according to the first embodiment of the present invention.

As shown in FIG. 5, a fuel cell system 200 according to this embodiment comprises a fuel processor 201 configured to convert a feed material such as a natural gas into hydrogen through a steam reforming reaction to generate a fuel gas containing plenty of hydrogen and to supply the fuel gas to a fuel cell 202 described later, an air blower 203 configured to supply air as an oxidizing gas to the fuel cell 202, the fuel cell 202 configured to generate power using the fuel gas supplied from the fuel processor 201 and the oxidizing gas supplied from an air blower 203, an inverter 204 configured to convert a DC power resulting from power generation in the fuel cell 202 into an AC power, a load power detecting means 205 that is capable of detecting power consumption of a power load 213 that consumes the AC power output from the inverter 204, and a control portion 206 configured to, based on a signal output from the load power detecting means 205, control start and stop of the operation of the fuel cell system 200, a series of operations performed from the start of the operation until start of power generation, and a power generation operation of the fuel cell 202 after start of the power generation, etc. As shown in FIG. 5, the load power 213 is connected to a commercial power 214.

The control portion 206 includes a power amount changing means 207 configured to change an output power amount of the fuel cell system 200 according to the power consumption of the power load 213 which is detected by the load power detecting means 205. The control portion 206 further includes an operation stop determination means 209 configured to stop the power generation operation of the fuel cell 202 when the power consumption of the power load 213 which is detected by the load power detecting means 205 is below a preset power threshold at which the power generation operation of the fuel cell 202 is stopped for a preset predetermined time period, or below a preset predetermined frequency within the predetermined time period. The control portion 206 further includes a time period setting means 208 configured to set a time period (set a daytime period or a night period) based on a current time. The control portion 206 further includes a learning means 215 configured to store and learn a power consumption pattern of the power load 213 in a predetermined time period. The control portion 206 further includes a power threshold setting means 210, a time setting means 211, and a frequency setting means 212 that are respectively configured to set, in the operation stop determination means 209, a power threshold condition, a time condition, a frequency condition, etc, which are conditions that cause the fuel cell 202 to stop the power generation operation based on a signal output from the time period setting means 208 or the learning means 215. A plurality of power threshold conditions, time conditions, frequency conditions, etc are pre-stored in the power threshold setting means 210, the time setting means 211, and the frequency setting means 212. According to the signal output from the time period setting means 208 or the learning means 215, the power threshold setting means 210, the time setting means 211, and the frequency setting means 212 set, in the operation stop determination means 209, an optimal power threshold condition, an optimal time condition, an optimal frequency condition, etc which are suitable for the current situation. The control portion 206 is configured by a microcomputer, and the means 207 to 212 and 215 are implemented by software stored in memories of the microcomputer. A condition setting means 220 includes the means 210 to 212 and 215.

As described above, the power load 213 is connected to the load power detecting means 205. The power load 213 is configured to consume at least one of the power generated in the fuel cell system 200 or the commercial power 214. The power load 213 includes home electronic appliances.

In the fuel cell system 200 of FIG. 5, the fuel gas generated in the fuel processor 201 and the oxidizing gas from the air blower 203 are supplied to the fuel cell 202. The fuel cell 202 carries out power generation using the fuel gas and the oxidizing gas to generate the DC power. The DC power output from the fuel cell 202 is input to the inverter 204. The inverter 204 converts the DC power supplied from the fuel cell 202 into an AC power. The AC power output from the inverter 204 is supplied to the power load 213 through the load power detecting means 205. In the power load 213, the power supplied from the fuel cell system 200 is consumed. At this time, excess output power is stored in a storage battery or the like which is not specifically shown in FIG. 5. If the output power of the fuel cell 202 is insufficient for the power consumption in the power load 213, the commercial power 214 makes up for the deficiency. The control portion 206 properly controls a power generation state of the fuel cell 202.

Subsequently, the power generation operation of the fuel cell system according to the first embodiment of the present invention will be described with reference to the drawings, based on an example of an operation pattern during a day.

Figure 1:
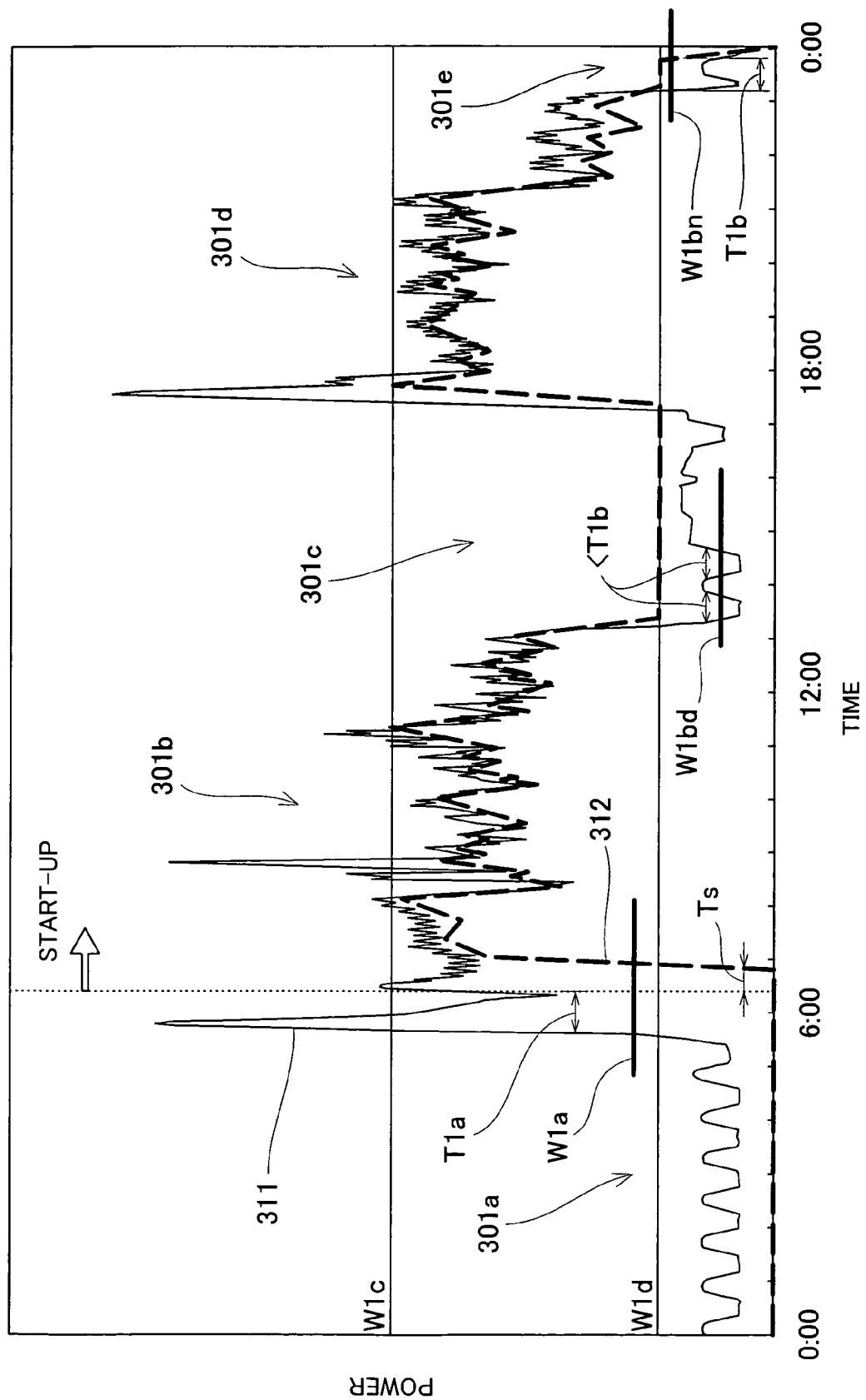
FIG. 1 is a view schematically showing an example of an operation pattern of a fuel cell system according to a first embodiment of the present invention.

FIG. 1 is a view schematically showing an example of an operation pattern during a day of a fuel cell system according to a first embodiment of the present invention. In FIG. 1, an ordinate axis indicates a power axis and an abscissa axis indicates a time axis.

In FIG. 1, a curve 311 indicates a time lapse variation in the power consumed in the power load 213, and a curve 312 indicates a time lapse variation in the output power of the fuel cell 202. In FIG. 1, a maximum output power $W1c$ indicates a maximum value of the power that is capable of being output from the fuel cell 202, and a minimum output power $W1d$ indicates a minimum value of the power that is capable of being output from the fuel cell system 202.

As indicated by the curve 311 of FIG. 1, the power consumption in general home is typically less in a first time period 301a from 0:00 at midnight to 6:00 in early morning. However, in a second time period 301b from 6:00 in early morning to 12:00 at noon, the power load 213 is used much by household tasks or the like, and hence the power consumption increases. In a third time period 301c from 12:00 at noon to 6:00 in evening, the number of power loads 213 in operation decreases, and hence the power consumption decreases. In a fourth time period 301d from 6:00 in evening to 23:00 at midnight, the number of power loads 213 in operation increases because of the household tasks or the like, and hence the power consumption increases again. In a fifth time period 301e from 23:00 at midnight to 0:00 at midnight, the power consumption of the power load 213 deceases because, for example, users are sleeping.

The fuel cell 202 in the fuel cell system 200 of this embodiment outputs power as indicated by the curve 312 of FIG. 1 in response to the variation in the power consumption of the power load 213 during a day. Specifically, as shown in FIG. 1, when the load power detecting means 205 of the fuel cell system 200 detects that the power consumption of the power load 213 is above an operation start power threshold $W1a$ which is a preset power threshold at which the fuel cell 202 starts power generation operation in the first time period 301a, the power generation of the fuel cell 202 is started-up. The fuel cell 202 starts to output the power as indicated by the curve 312 after an operation preparation time period Ts in which, for example, the fuel gas is generated in the fuel processor 201. When the output power of the fuel cell 202 becomes substantially equal to the power consumption in the power load 213 in the second time period 301b, the power amount changing means 207 controls the output power of the fuel cell 202 between the maximum output power $W1c$ and the minimum output power $W1d$ according to the variation in the power consumption of the power load 213 which is detected by the load power detecting means 205. At this time, if the power consumption of the power load 213 is above the output power of the fuel cell 202, the commercial power 214 makes up for the deficiency.

In this embodiment, as the operation stop power threshold at which the power generation operation of the fuel cell 202 is stopped, an operation stop power threshold $W1bd$ for a time period in which the power load 213 operates relatively frequently, and an operation stop power threshold $W1bn$ for a time period in which the power load 213 operates less frequently are pre-stored in the power threshold setting means 210. In this embodiment, as shown in FIG. 1, the operation stop power threshold $W1bd$ is set lower than the operation stop power threshold $W1bn$ when comparing these thresholds. Typically, the time period in which the power load 213 operates relatively frequently is a daytime period and the time period in which the power load 213 operates less frequently is a night period. Accordingly, in this embodiment, the time period setting means 208 is configured to determine that a current time is the daytime period when the current time is between 6:00 to 18:00 corresponding to the second to third time periods 301b to 301c, or to determine that a current time is the night period when the current time is between 18:00 to 6:00 corresponding to the first time period 301a and the fourth to fifth time periods 301d to 301e. And, as shown in FIG. 1, the power threshold setting means 210 sets, in the operation stop determination means 209, the operation stop power threshold $W1bd$ when the time period setting means 208 determines that the current time is the daytime period, and the operation stop power threshold $W1bn$ when the time period setting means 208 determines that the current time is the night period. In either case, the time setting means 211 sets the predetermined time period $T1b$ in the operation stop determination means 209. As described above, the operation stop power threshold $W1bd$ is set lower than the operation stop power threshold $W1bn$ when comparing these thresholds. The power generation operation of the fuel cell 202 is configured not to frequently stop in the daytime period in which the power load 213 operates relatively frequently, by setting two different operation stop power thresholds. Specifically, as illustrated by the time period 301c of FIG. 1, when the power consumption of the power load 213 is below the operation stop power threshold $W1bd$ for less than the predetermined time period $T1b$, the power generation operation of the fuel cell 202 is not stopped. In this case, the operation for generating the fuel gas in the fuel processor 201 is not stopped. As illustrated by the third time period 301c of FIG. 1, the fuel cell 202 continues to output the power at the minimum output power $W1d$. While the minimum output power $W1d$ is above the power consumption of the power load 213 in the third time period 301c, excess power generated by the fuel cell 202 continuing to output the power at the minimum output power $W1d$ is stored in the storage battery or the like which is not specifically illustrated in FIG. 5.

As illustrated by the fourth time period 301d, when the load power detecting means 205 of the fuel cell system 200 detects that the power consumption of the power load 213 increases again, the fuel cell 202 increases the output power as indicated by the curve 312. In this case, as in the second time period 301b, as illustrated by the fourth time period 301d, the power amount changing means 207 controls the output power of the fuel cell 202 between the maximum output power $W1c$ and the minimum output power $W1d$ according to the variation in the power consumption of the power load 213 which is detected by the load power detecting means 205. At this time, if the power consumption of the power load 213 is above the output power of the fuel cell 202, the commercial power 214 makes up for the deficiency.

As illustrated by the fifth time period 301e, when the load power detecting means 205 detects that the power consumption of the power load 213 is below the operation stop power threshold W1$bn$ for the predetermined time period T1$b$ or more, the operation stop determination means 209 stops the power generation of the fuel cell 202. Simultaneously, the operation of the fuel processor 201 is stopped. In this case, the commercial power 214 supplies the power to the power load 213.

As should be appreciated from the foregoing, in the fuel cell system 200 of this embodiment, the output power of the fuel cell 202 is controlled according to the variation in the power consumption of the power load 213. When the power consumption of the power load 213 transitions from the large amount state in, for example, the second time period 301$b$, to the small amount state in, for example, the third time period 301$c$, and the power consumption of the operation stop power threshold W1$bd$ or less does not continue for the predetermined time period T1$b$ or more, the power generation operation of the fuel cell 202 is not stopped. On the other hand, when the power consumption of the power load 213 transitions from the large amount state in, for example, the fourth time period 301$d$, to the small amount state in, for example, the fifth time period 301$e$, and the power consumption of the operation stop power threshold W1$bn$ or less continues for the predetermined time period T1$b$ or more, the power generation operation of the fuel cell 202 is stopped.

In accordance with the fuel cell system 200 of this embodiment, as the operation stop power threshold W1$b$ which is a condition for causing the fuel cell 202 to stop the power generation operation, the operation stop power threshold W1$bd$ or the operation stop power threshold W1$bn$, the power values of which are different as indicated by W1$bd$<W1$bn$, is set in the operation stop determination means 209 based on determination of the time period setting means 208. For this reason, in the time period in which the power consumption of the power load 213 is less, for example, the third time period 301$c$, unnecessary stop of the power generation operation of the fuel cell 202 is inhibited. This makes it possible to reduce wasteful energy consumption associated with the start-up of the power generation operation of the fuel cell 202 (in particular, energy consumption in the operation preparation time period Ts associated with the start-up of the fuel processor 201). As a result, the power generation operation with high energy utilization efficiency can continue.

In this embodiment, a user (or operator, or administrator) of the fuel cell system 200 may set the operation stop power threshold W1$bd$ and the operation stop power threshold W1$bn$ with an input means which is not specifically illustrated in FIG. 5, or otherwise, the learning means 215 may store and learn the power consumption pattern of the power load 213 per week (or per month, or per season) to set these thresholds in the power threshold setting means 210. In this case, for example, the learning means 215 selects the third time period 301$c$ and the fifth time period 301$e$ in which the power consumption of the power load 213 in FIG. 1 is less, and sets the smaller operation stop power threshold W1$bd$ for the third time period 301$c$ in which the power consumption amount is relatively large, and the larger operation stop power threshold W1$bn$ for the fifth time period 301$e$ in which the power consumption amount is relatively smaller.

In this embodiment, it is assumed that the time period in which the power load 213 operates relatively frequently is the daytime period, and the time period in which the power load 213 operates less frequently is the night time period. In this embodiment, the time period setting means 208 determines whether the current time period is the daytime period or the night period. Alternatively, the user (or the operator or the administrator) of the fuel cell system 200 may determine it and may set them with the input means which is not specifically illustrated in FIG. 5.

While in this embodiment, the daytime period and the night period are each 12 hours, the daytime period may be set to 12 hours or more, or otherwise the night period may be set to 12 hours or more.

While in this embodiment, a day is divided in two for each 12 hours, such a dividing method is merely exemplary, and any other dividing method may be employed.

Depending on activity cycles of users, the time period in which the power load 213 operates relatively frequently may be the night period, and the time period in which the power load 213 operates less frequently may be the daytime period. Also, the power consumption of the power load 213 may vary regardless of the daytime period or the night period. In this case, the learning means 215 recognizes the variation pattern of the power consumption of the power load 213 by its learning function, and selects the operation stop power threshold W1$bd$ or the operation stop power threshold W1$bn$ to be set in the operation stop determination means 209 based on this recognition. In such a configuration, in the time period in which the power load 213 operates relatively frequently, unnecessary stop of the power generation operation of the fuel cell 202 is inhibited.

While in this embodiment, the operation stop power threshold is set based on the signal output from the time period setting means 208 or the learning means 215, it may alternatively be set by the user (or operator, or administrator) of the fuel cell system 200 with the input means which is not specifically illustrated in FIG. 5.

While in this embodiment, the operation stop power threshold W1$bd$ and the operation stop power threshold W1$bn$ are thresholds with respect to instantaneous power amounts, they may be thresholds with respect to an integrated power amount which is detected by the load power detecting means 205 in the predetermined time period T1$b$. In such a configuration, the same effects as that of this embodiment are obtained.

Embodiment 2

A second embodiment of the present invention illustrates that a frequency condition is added to the condition associated with the start-up or the stop of the fuel cell system, regarding the operation conditions of the fuel cell in the fuel cell system.

Since the fuel cell system of the second embodiment of the present invention is identical to that of the fuel cell system 200 of the first embodiment, it will not be further described. In addition, an example of an operation pattern of the fuel cell system during a day of the second embodiment of the present invention is similar to the example of the operations pattern of the first embodiment, and therefore, difference between the first embodiment and the second embodiment will be described herein.

Figure 2:
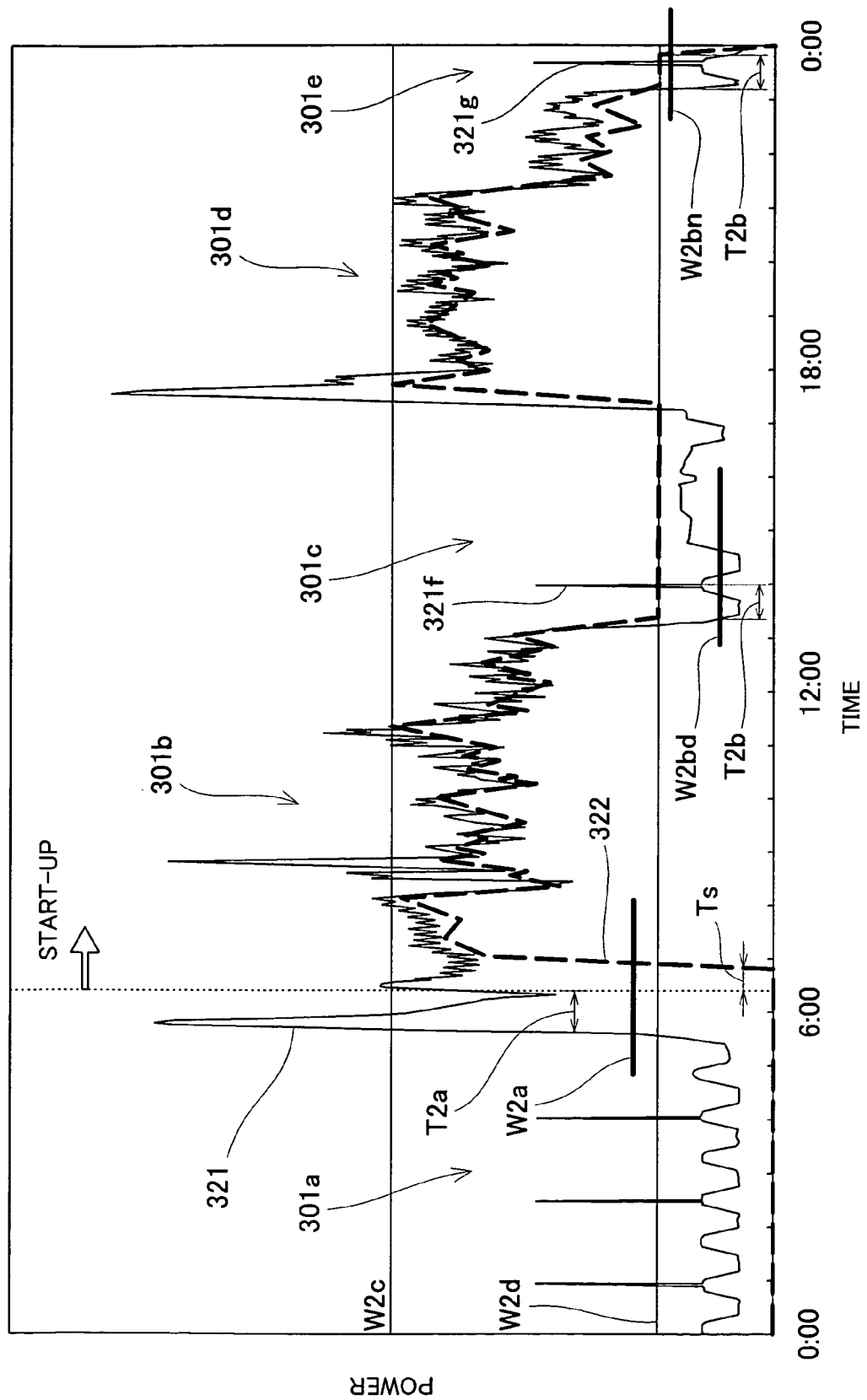
FIG. 2 is a view schematically showing an example of an operation pattern of a fuel cell system according to a second embodiment of the present invention.

FIG. 2 is a view schematically showing the example of the operation pattern of the fuel cell system according to the second embodiment of the present invention. In FIG. 2, an ordinate axis indicates a power axis and an abscissa axis indicates a time axis.

In FIG. 2, a curve 321 indicates a time lapse variation in the power consumption of the power load 213, and a curve 322 indicates a time lapse variation in the output power of the fuel cell 202. In addition, in FIG. 2, a maximum output power W2$c$ indicates a maximum value of the power that is capable of being output from the fuel cell 202, and a minimum output power W2d indicates a minimum value of the power that is capable of being output from the fuel cell 202.

The fuel cell 202 in the fuel cell system 200 of this embodiment outputs the power as indicated by the curve 322 of FIG. 2 in response to the variation in the power consumption of the power load 213 which is illustrated by the curve 321 of FIG. 2. Specifically, when the load power detecting means 205 of the fuel cell system 200 detects that the power consumption of the power load 213 exceeds, with a predetermined frequency F2a or more within a predetermined time period T2a, an operation start power threshold W2a which is a preset power threshold at which the fuel cell 202 starts power generation operation, the power generation operation of the fuel cell 202 is started-up. The reason why the frequency F2a is added as the start-up condition of the fuel cell 202 is that the power generation operation of the fuel cell 202 reliably starts even when the power consumption of the power load 213 is below the operation start power threshold W2a instantaneously within the predetermined time period T2a.

It is determined whether or not the power consumption of the power load 213 exceeds the operation start power threshold W2a with the predetermined frequency F2a or more within the predetermined time period T2a based on the concept below. For example, it is assumed that the predetermined time period T2a is 1 hour, the power consumption value of the power load 213 is sampled by the load power detecting means 205 in a cycle of once per second, and the predetermined frequency F2a is 80%. In this case, the load power detecting means 205 samples the power consumption value of the power load 213 3600 times in total in the predetermined time period T2a. When the load power detecting means 205 counts the power consumption value of the power load 213 which exceeds the operation start power threshold W2a 2880 times corresponding to the predetermined frequency F2a (here, 80%), the control portion 206 determines that the fuel cell 202 should start-up the power generation operation. Whether or not to start-up the power generation operation of the fuel cell 202 is sequentially determined in the operation of the control portion 206 of the fuel cell system 200. The control portion 206 includes a counting portion that counts the power consumption value of the power load 213 which exceeds the operation start power threshold W2a, an integrating portion that integrates the number of times the counting portions outputs a signal, a command portion that outputs a command associated with the start-up of the power generation operation of the fuel cell 202 based on the signal output from the integrating portion, a start-up portion that starts-up the power generation operation of the fuel cell 202 based on the signal output from the command portion, etc, although these are not shown in FIG. 5.

Upon start of the power generation operation of the fuel cell 202, the fuel cell 202 starts to output the power as indicated by the curve 322 after an elapse of the operation preparation time period Ts in which, for example, the fuel gas is generated in the fuel processor 201. When the output power of the fuel cell 202 becomes substantially equal to the power consumption of the power load 213 in the second time period 301b, the power amount changing means 207 controls the output power of the fuel cell 202 between the maximum output power W2c and the minimum output power W2d according to the variation in the power consumption of the power load 213 which is detected by the load power detecting means 205. At this time, if the power consumption of the power load 213 is above the output power of the fuel cell 202, the commercial power 214 makes up for the deficiency.

In this embodiment, also, as the operation stop power threshold at which the power generation operation of the fuel cell 202 is stopped, an operation stop power threshold W2bd for a time period in which the power load 213 operates relatively frequently, and an operation stop power threshold W2bn for a time period in which the power load 213 operates less frequently are pre-stored in the power threshold setting means 210. The relationship between the operation stop power threshold W2bd and the operation stop power threshold W2bn is identical to that of the first embodiment. In this embodiment, the predetermined time period T2b and the predetermined frequency F2b are pre-stored in the time setting means 211 and the frequency setting means 212, respectively.

As in the first embodiment, when the time period setting means 208 determines that the current time is the daytime period, the power threshold setting means 210 sets the operation stop power threshold W2bd in the operation stop determination means 209, while when the time period setting means 208 determines that the current time is the night period, the power threshold setting means 210 sets the operation stop power threshold W2bn in the operation stop determination means 209. In either case, the time setting means 211 and the frequency setting means 212 set the predetermined time period T2b and the predetermined frequency F2b in the operation stop determination means 209, respectively. As illustrated by the third time period 301c of FIG. 2, when the power consumption of the power load 213 is below the operation stop power threshold W2bd with less than the predetermined frequency F2b within the predetermined time period T2b, the power generation operation of the fuel cell 202 is not stopped. In this case, the operation for generating the fuel gas in the fuel processor 201 is not stopped. On the other hand, if the power consumption of the power load 213 is below the operation stop power threshold W2bd with the predetermined frequency F2b or more within the predetermined time period T2b, the power generation operation of the fuel cell 202 is stopped. In this case, the operation for generating the fuel gas in the fuel processor 201 is stopped. More specifically, assuming that F2b=70%, for example, when the load power detecting means 205 detects that the power consumption instantaneously exceeds the operation stop power threshold W2bd, like a power consumption 321f in the third time period 301c, and it is below the operation stop power threshold W2bd 70% or more within the predetermined time period T2b (i.e., the frequency of the power consumption 321f within the predetermined time period T2b is less than 30%), the power generation operation of the fuel cell 202 is stopped. When the power generation operation of the fuel cell 202 is not stopped, the fuel cell 202 continues to output the power at the minimum output power W2d as indicated by the third time period 301c of FIG. 2. While in the third time period 301c, the minimum output power W2d is above the power consumption of the power load 213, the excess power generated by the fuel cell 202 continuing to output the power at the minimum output power W2d is stored in the storage battery or the like, as in the first embodiment.

As illustrated by the fourth time period 301d, when the load power detecting means 205 of the fuel cell system 200 detects that the power consumption of the power load 213 increases again, the fuel cell 202 increases the output power as indicated by the curve 322. In this case, as in the second time period 301b, as illustrated by the fourth time period 301d, the power amount changing means 207 controls the output power of the fuel cell 202 between the maximum output power W2c and the minimum output power W2d according to the variation in the power consumption of the power load 213 which is detected by the load power detecting means 205. At this time, if the power consumption of the power load 213 is above the output power of the fuel cell 202, the commercial power 214 makes up for the deficiency.

As illustrated by the fifth time period 301e, when the load power detecting means 205 detects that the power consumption of the power load 213 is below the operation stop power threshold W2bn with the predetermined frequency F2b or more within the predetermined time period T2b, the operation stop determination means 209 stops the power generation operation of the fuel cell 202. Simultaneously, the operation of the fuel processor 201 is stopped. More specifically, assuming that F2b=70%, for example, when the load power detecting means 205 detects that the power consumption instantaneously exceeds the operation stop power threshold W2bn, like a power consumption 321g in the fifth time period 301e, and it is below the operation stop power threshold W2bn 70% or more within the predetermined time T2b (i.e., the frequency of the power consumption 321g within the predetermined time T2b is less than 30%), the power generation operation of the fuel cell 202 is stopped. In this case, the commercial power 214 supplies the power to the power load 213.

As should be appreciated from the foregoing, in this embodiment, when the power consumption of the power load 213 transitions from the large amount state in, for example, the second time period 301b, to the small amount state in, for example, the third time period 301c, and the power consumption of the operation stop power threshold W2bd or less does not occur with the predetermined frequency F2b or more within the predetermined time period T2b, the power generation operation of the fuel cell 202 is not stopped. On the other hand, when the power consumption of the power load 213 transitions from the large amount state in, for example, the fourth time period 301d, to the small amount state in, for example, the fifth time period 301e, and the power consumption of the operation stop power threshold W2bn or less occurs with the predetermined frequency F2b or more within the predetermined time period T2b, the power generation operation of the fuel cell 202 is stopped.

In such a configuration, the same effects as those of the first embodiment are obtained. Since wasteful power consumption associated with the start-up of the power generation operation of the fuel cell 202 is reduced, the power generation operation with high energy utilization efficiency can continue. In other respects, this embodiment is identical to the first embodiment.

Embodiment 3

A third embodiment of the present invention illustrates that a time condition associated with a power generation operation of a fuel cell is varied according to a use status of a fuel cell system.

Since the fuel cell system according to the third embodiment of the present invention is identical in construction to the fuel cell system 200 described in the first embodiment, it will not be further described. In addition, since an operation pattern example during a day of the fuel cell system of the third embodiment is similar to the operation pattern example described in the first embodiment, difference between the first embodiment and the third embodiment will be described in detail.

Figure 3:
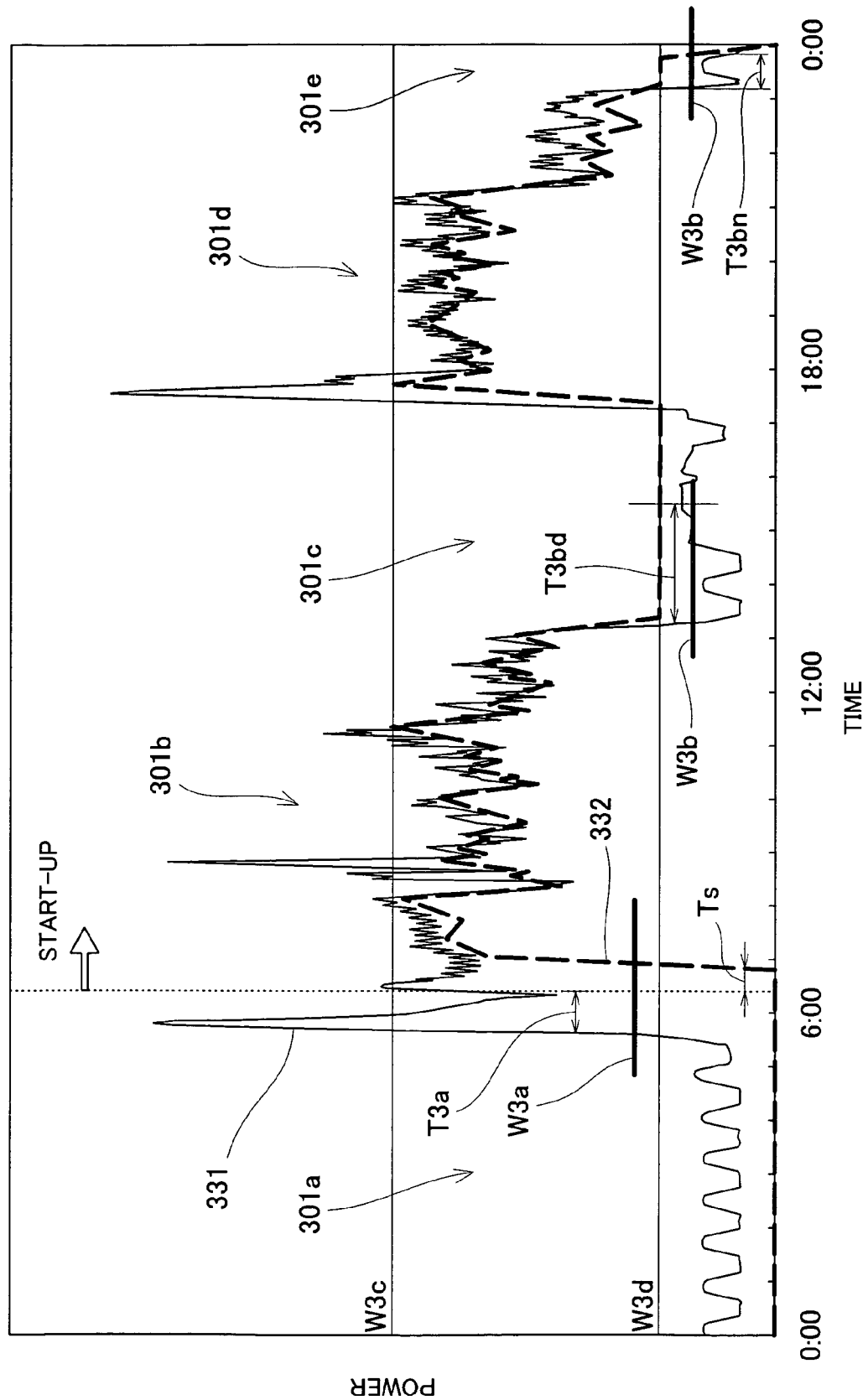
FIG. 3 is a view schematically showing an example of an operation pattern of a fuel cell system according to a third embodiment of the present invention.

FIG. 3 is a view schematically showing the operation pattern during a day of the fuel cell system according to the third embodiment of the present invention. In FIG. 3, an ordinate axis indicates a power axis and an abscissa axis indicates a time axis.

In FIG. 3, a curve 331 indicates a time lapse variation in the power consumption of the power load 213, and a curve 332 indicates a time lapse variation in the output power of the fuel cell 202. In FIG. 3, a maximum output power W3c indicates a maximum value of the power that is capable of being output from the fuel cell 202, and a minimum output power W3d indicates a minimum value of the power that is capable of being output from the fuel cell 202.

The fuel cell 202 in the fuel cell system 200 of this embodiment outputs the power as indicated by the curve 332 of FIG. 3 in response to the variation in the power consumption of the power load 213 which is illustrated by the curve 331 of FIG. 3. Specifically, when the load power detecting means 205 of the fuel cell system 200 detects that the power consumption of the power load 213 exceeds, for a predetermined time period T3a or more in the first time period 301a, an operation start power threshold W3a which is a preset power threshold at which the fuel cell 202 starts power generation operation, the power generation operation of the fuel cell 202 is started-up. The fuel cell 202 starts to output the power as indicated by the curve 332 after an elapse of the operation preparation time period Ts in which, for example, the fuel gas is generated in the fuel processor 201. When the output power of the fuel cell 202 becomes substantially equal to the power consumption of the power load 213 in the second time period 301b, the power amount changing means 207 controls the output power of the fuel cell 202 between the maximum output power W3c and the minimum output power W3d according to the variation in the power consumption of the power load 213 which is detected by the load power detecting means 205. At this time, if the power consumption of the power load 213 is above the output power of the fuel cell 202, the commercial power 214 makes up for the deficiency.

In this embodiment, as the operation stop power thresholds at which the power generation operation of the fuel cell 202 is stopped, operation stop power thresholds W3b which are equal are used. The operation stop power thresholds W3b are pre-set in the power threshold setting means 210. In this embodiment, a predetermined time period T3bd in which the power load 213 operates relatively frequently and a predetermined time period T3bn in which the power load 213 operates less frequently are set in the time setting means 211. The relationship between the predetermined time period T3bd and the predetermined time period T3bn is such that the predetermined time period T3bd is set longer than the predetermined time period T3bn.

As in the first embodiment, when the time period setting means 208 determines that a current time is a daytime period, the time setting means 211 sets the predetermined time period T3bd in the operation stop determination means 209, while when the time period setting means 208 determines that the current time is a night period, the time setting means 211 sets the predetermined time period T3bn in the operation stop determination means 209. In either case, the power threshold setting means 210 sets the operation stop power threshold W3b in the operation stop determination means 209. As illustrated by the third time period 301c of FIG. 3, when the power consumption of the power load 213 is below the operation stop power threshold W3b for less than the predetermined time period T3bd, the power generation operation of the fuel cell 202 is not stopped. In this case, the operation for generating the fuel gas in the fuel processor 201 is not stopped. On the other hand, when the power consumption is below the operation stop power threshold W3b for the predetermined time period T3bd or more, the power generation operation of the fuel cell 202 is stopped. In this case, the operation for generating the fuel gas in the fuel processor 201 is stopped.

When the power generation operation of the fuel cell 202 is not stopped, the fuel cell 202 continues to output the power at the minimum output power W3d as illustrated by the third time period 301c of FIG. 3. While in the third time period 301c, the minimum output power W3d is above the power consumption of the power load 213, excess power generated by the fuel cell 202 continuing to output the power at the minimum output power W3d is stored in the storage battery or the like as in the first embodiment.

As illustrated by the fourth time period 301d, when the load power detecting means 205 of the fuel cell system 200 detects that the power consumption of the power load 213 increases again, the fuel cell 202 increases the output power as indicated by the curve 332. In this case, as in the second time period 301b, as illustrated by the fourth time period 301d, the power amount changing means 207 controls the output power of the fuel cell 202 between the maximum output power W3c and the minimum output power W3d according to the variation in the power consumption of the power load 213 which is detected by the load power detecting means 205. At this time, if the power consumption of the power load 213 is above the output power of the fuel cell 202, the commercial power 214 makes up for the deficiency.

As illustrated by the fifth time period 301e, when the load power detecting means 205 detects that the power consumption of the power load 213 is below the operation stop power threshold W3b for the predetermined time period T3bn or more, the operation stop determination means 209 stops the power generation operation of the fuel cell 202. Simultaneously, the operation of the fuel processor 201 is stopped. In this case, the commercial power 214 supplies the power to the power load 213.

As should be appreciated from the foregoing, in this embodiment, when the power consumption of the power load 213 transitions from the large amount state in, for example, the second time period 301b, to the small amount state in, for example, the third time period 301c, and the power consumption of the operation stop power threshold W3b or less does not continue for the predetermined time period T3bd or more, the power generation operation of the fuel cell 202 is not stopped. On the other hand, when the power consumption of the power load 213 transitions from the large amount state in, for example, the fourth time period 301d, to the small amount state in, for example, the fifth time period 301e, and the power consumption of the operation stop power threshold W3b or less continues for the predetermined time period T3bn or more, the power generation operation of the fuel cell 202 is stopped.

In such a configuration, since unnecessary stop of the power generation operation of the fuel cell 202 is inhibited, the same effects as those of the first embodiment are obtained.

In this embodiment, the user (or operator, or administrator) of the fuel cell system 200 may set the predetermined time period T3bd and the predetermined time period T3bn, or otherwise, the learning means 215 may store and learn the power consumption pattern of the power load 213 per week (or per month, or per season) to set these time periods in the time setting means 211 in a manner described in the first embodiment.

While in this embodiment, the operation stop power threshold W3b is a threshold for an instantaneous power amount, it may alternatively be a threshold for an integrated power amount which is detected by the load power detecting means 205 in the predetermined time period T3bd or in the predetermine time period T3bn. In other respect, the third embodiment is identical to the first embodiment.

Embodiment 4

A fourth embodiment of the present invention illustrates that a frequency condition associated with a power generation operation of a fuel cell is varied according to a use status of e fuel cell system.

Since the fuel cell system according to the fourth embodiment of the present invention is identical in construction to the fuel cell system 200 described in the first embodiment, it will not be further described. In addition, since an operation pattern example during a day of the fuel cell system of the fourth embodiment is similar to the operation pattern example described in the first embodiment, difference between the first embodiment and the fourth embodiment will be described in detail.

Figure 4:
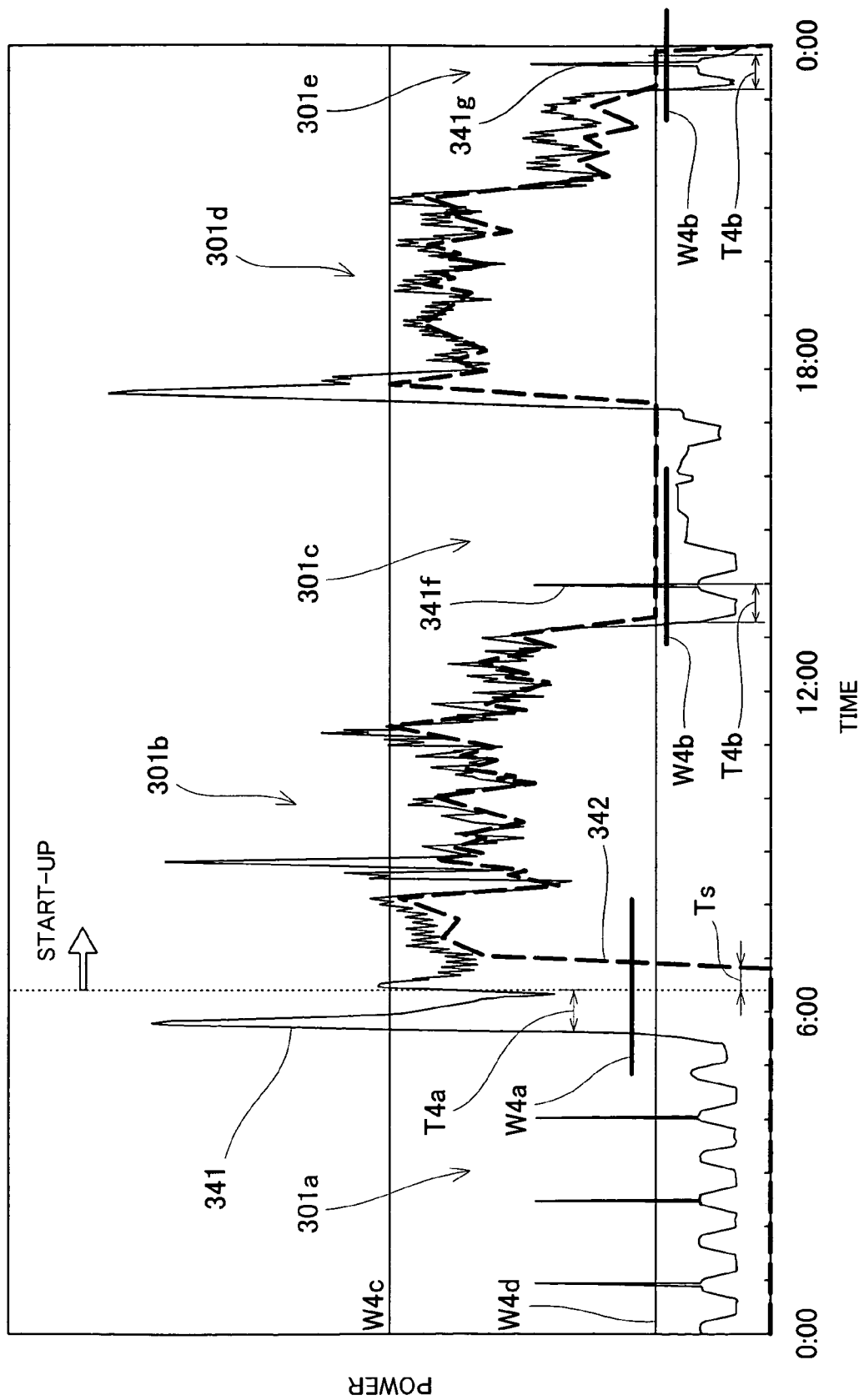
FIG. 4 is a view schematically showing an example of an operation pattern of a fuel cell system according to a fourth embodiment of the present invention.

FIG. 4 is a view schematically showing the operation pattern during a day of the fuel cell system according to the fourth embodiment of the present invention. In FIG. 4, an ordinate axis indicates a power axis and an abscissa axis indicates a time axis.

In FIG. 4, a curve 341 indicates a time lapse variation in the power consumption of the power load 213, and a curve 342 indicates a time lapse variation in the output power of the fuel cell 202. In addition, in FIG. 4, a maximum output power W4c indicates a maximum value of the power that is capable of being output from the fuel cell 202, and a minimum output power W4d indicates a minimum value of the power that is capable of being output from the fuel cell 202.

The fuel cell 202 in the fuel cell system 200 of this embodiment outputs the power as indicated by the curve 342 of FIG. 4 in response to the variation in the power consumption of the power load 213 which is illustrated in the curve 341 of FIG. 4. Specifically, when the load power detecting means 205 of the fuel cell system 200 detects that the power consumption of the power load 213 exceeds, with a predetermined frequency F4a or more within a predetermined time period T4a, an operation start power threshold W4a which is a preset power threshold at which the fuel cell 202 starts power generation operation, the power generation operation of the fuel cell 202 is started-up.

Upon the start-up of the power generation operation of the fuel cell 202, the fuel cell 202 starts to output the power as indicated by the curve 342 after an elapse of the operation preparation time period Ts in which, for example, the fuel gas is generated in the fuel processor 201. When the output power of the fuel cell 202 becomes substantially equal to the power consumption of the power load 213 in the second time period 301b, the power amount changing means 207 controls the output power of the fuel cell 202 between the maximum output power W4c and the minimum output power W4d according to the variation in the power consumption of the power load 213 which is detected by the load power detecting means 205. At this time, if the power consumption of the power load 213 is above the output power of the fuel cell 202, the commercial power 214 makes up for deficiency.

In this embodiment, as the operation stop power thresholds at which the power generation operation of the fuel cell 202 is stopped, operation stop power thresholds W4b which are equal are used. The operation stop power thresholds W4b are pre-stored in the power threshold setting means 210. In this embodiment, a predetermined frequency F4bd for a time period in which the power load 213 operates relatively frequently and a predetermined frequency F4bn for a time period in which the power load 213 operates relatively less frequently are set in the frequency setting means 212. The relationship between the predetermined frequency F4bd and the predetermined frequency F4bn is such that the predetermined frequency F4$bd$ is higher than the predetermined frequency F4$bn$. Also, in this embodiment, the predetermined time period T4$b$ is pre-stored in the time setting means 211.

As in the first embodiment, when the time period setting means 208 determines that the current time is the daytime period, the frequency setting means 212 sets the predetermined frequency F4$bd$ in the operation stop determination means 209, while when the time period setting means 208 determines that the current time is the night period, the frequency setting means 212 sets the predetermined frequency F4$bn$ in the operation stop determination means 209. In either case, the power threshold setting means 210 and the time setting means 211 set the operation stop power threshold W4$b$ and the predetermined time period T4$b$ in the operation stop determination means 209, respectively. As illustrated by the third time period 301$c$ of FIG. 4, when the power consumption of the power load 213 is below the operation stop power threshold W4$b$ with less than the predetermined frequency F4$bd$ within the predetermined time period T4$b$, the power generation operation of the fuel cell 202 is not stopped. In this case, the operation for generating the fuel gas in the fuel processor 201 is not stopped. On the other hand, when the power consumption of the power load 213 is below the operation stop power threshold W4$b$ with the predetermined frequency F4$bd$ or more within the predetermined time period T4$b$, the power generation operation of the fuel cell 202 is stopped. In this case, the operation for generating the fuel gas in the fuel processor 201 is stopped. More specifically, assuming that F4$bd$=98%, for example, when the load power detecting means 205 detects that the power consumption instantaneously exceeds the operation stop power threshold W4$b$, like a power consumption 341$f$ in the third time period 301$c$, and it is below the operation stop power threshold W4$b$ 98% or more within the predetermined time T4$b$ (i.e., the frequency of the power consumption 341$f$ within the predetermined time T4$b$ is less than 2%), the power generation operation of the fuel cell 202 is stopped. When the power generation operation of the fuel cell 202 is not stopped, the fuel cell 202 continues to output the power at the minimum output power W4$d$ as indicated by the third time period 301$c$ of FIG. 4. While in the third time period 301$c$, the minimum output power W4$d$ is above the power consumption of the power load 213, the excess power generated by the fuel cell 202 continuing to output the power at the minimum output power W4$d$ is stored in the storage battery or the like, as in the first embodiment.

As illustrated by the fourth time period 301$d$, when the load power detecting means 205 of the fuel cell system 200 detects that the power consumption of the power load 213 increases again, the fuel cell 202 re-starts to output the power as indicated by the curve 342. In this case, as in the second time period 301$b$, as illustrated by the fourth time period 301$d$, the power amount changing means 207 controls the output power of the fuel cell 202 between the maximum output power W4$c$ and the minimum output power W4$d$ according to the variation in the power consumption of the power load 213 which is detected by the load power detecting means 205. At this time, if the power consumption of the power load 213 is above the output power of the fuel cell 202, the commercial power 214 makes up for the deficiency.

As illustrated by the fifth time period 301$e$, when the power consumption of the power load 213 is below the operation stop power threshold W4$b$ with the predetermined frequency F4$bn$ or more within the predetermined time period T4$b$, the operation stop determination means 209 stops the power generation operation of the fuel cell 202. Simultaneously, the operation of the fuel processor 201 is stopped. More specifically, assuming that F4$bn$=70%, for example, when the load power detecting means 205 detects that the power consumption instantaneously exceeds the operation stop power threshold W4$b$, like a power consumption 341$g$ in the fifth time period 301$e$, and it is below the operation stop power threshold old W4$b$ 70% or more within the predetermined time period T4$b$ (i.e., the frequency of the power consumption 341$g$ within the predetermined time period T4$b$ is less than 30%), the power generation operation of the fuel cell 202 is stopped. In this case, the commercial power 214 supplies the power to the power load 213.

As should be appreciated from the foregoing, in this embodiment, when the power consumption of the power load 213 transitions from the large amount state in, for example, the second time period 301$b$, to the small amount state in, for example, the third time period 301$c$, and the power consumption of the operation stop power threshold W4$b$ or less does not occur with the predetermined frequency F4$bd$ or more within the predetermined time period T4$b$, the power generation of the fuel cell 202 is not stopped. On the other hand, when the power consumption of the power load 213 transitions from the large amount state in, for example, the fourth time period 301$d$, to the small amount state in, for example, the fifth time period 301$e$, and the power consumption of the operation stop power threshold W4$b$ or less occurs with the predetermined frequency F4$bn$ or more within the predetermined time period T4$b$, the power generation of the fuel cell 202 is stopped.

In such a configuration, since unnecessary stop of the power generation operation of the fuel cell 202 is inhibited, the same effects as those of the first embodiment are obtained.

In this embodiment, the user (or operator, or administrator) of the fuel cell system 200 may set the predetermined frequency F4$bd$ and the predetermined frequency F4$bn$, or otherwise, the learning means 215 may store and learn the power consumption pattern of the power load 213 per week (or per month, or in every season) to set these frequencies in the frequency setting means 212. In other respects, the fourth embodiment is identical to the first embodiment.

As thus far described, in the first to fourth embodiments of the present invention, the power generation operation of the fuel cell is stopped based on the power consumption of the power load which is detected by the load power detecting means. In the embodiments, it is determined whether or not the power generation operation of the fuel cell is stopped, according to the use status of the fuel cell system, by separately changing the power threshold condition, the time condition, and the frequency condition. Alternatively, it may be determined whether or not the power generation operation of the fuel cell is stopped according to the use status of the fuel cell, by changing two or more of the power threshold condition, the time condition, and the frequency condition together, unnecessary operation stop decreases, and thereby wasteful energy consumption associated with start-up of the fuel cell decreases, enabling desired power generation operation to continue. This is because, by changing two or more of the power threshold condition, the time condition, and the frequency condition together, which are used to stop the power generation operation of the fuel cell, the condition for stopping the power generation operation of the fuel cell is synergistically limited, thereby resulting in a significant decrease in the number of unnecessary power generation operation of the fuel cell.

The control portion included in the fuel cell system of the present invention is not intended to be limited to a configuration including an operation unit such as a CPU, but may be a configuration including a firmware, OS, and its peripheral device. Furthermore, the configuration of the present invention may be implement by software or hardware.

In the first to fourth embodiments, the fuel cell system has been described as an example of the power generation system. The present invention is applicable to any other power generation systems other than the fuel cell system, such as an engine power generation system, and the similar effects are obtained as in the embodiments of the present invention.

As should be appreciated from the foregoing, in accordance with the fuel cell system and the operation method thereof of the present invention, it is possible to provide a power generation system with high energy utilization efficiency, which is capable of inhibiting the unnecessary stop of power generation operation by changing the condition for determining whether or not to stop the power generation operation according to, for example, activity cycles of users and of thereby decreasing wasteful energy consumption, and an operation method thereof.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

A power generation system and an operation method thereof of the present invention are useful as a power generation system with high energy utilization efficiency, which is capable of inhibiting unnecessary stop of power generation operation by changing the condition for determining whether or not to stop the power generation operation according to, for example, activity cycles of users and of thereby decreasing wasteful energy consumption, and an operation method thereof.

The invention claimed is:

1. A power generation system comprising:
a power generation portion configured to generate power;
a load power detecting means configured to detect a load power which is supplied from a power source including said power generation portion to a load;
an operation stop determination means configured to stop a power generation operation of said power generation portion based on the load power detected by said load power detecting means and a stop condition; and
a stop condition setting means configured to set a stop condition,
wherein said stop condition setting means sets predetermined different stop conditions in a plurality of predetermined time periods in one day, and
wherein said operation stop determination means stops the power generation operation of said power generation portion based on each of the stop conditions set by said stop condition setting means and the load power detected by said load power detecting means.

2. The power generation system according to claim 1, wherein the time periods include two time periods into which one day is divided, the two time periods including at least 2:00 and at least 14:00, respectively.

3. The power generation system according to claim 1, wherein the time periods include three time periods into which one day is divided, the three time periods including at least 2:00, at least 10:00, and at least 18:00, respectively.

4. The power generation system according to claim 1, wherein the time periods include four time periods into which one day is divided, the four time periods including at least 2:00, at least 8:00, at least 14:00, and at least 20:00, respectively.

5. The power generation system according to claim 1, wherein the time periods and the stop conditions are pre-set.

6. The power generation system according to claim 1, further comprising:
an input means with which at least the time periods and the stop conditions are input, wherein said stop condition setting means sets the time periods and the stop conditions which have been input with said input means.

7. The power generation system according to claim 1, further comprising:
a learning means configured to learn at least the time periods and the stop conditions based on stored data of the load power which is detected by said load power detecting means, and said stop condition setting means sets the time periods and the stop conditions which have been obtained by said learning means.

8. The power generation system according to claim 1, wherein a stop condition includes at least one of a power condition, a time condition, and a frequency condition, and the at least one condition is set to have different values in the plurality of time periods.

9. The power generation system according to claim 8, wherein the power condition includes an instantaneous power threshold or an integrated power threshold.

10. The power generation system according to claim 9, wherein the instantaneous power threshold or the integrated power threshold is set according to an average value of the load power in each of the time periods.

11. The power generation system according to claim 8, wherein the time condition is a time in which the load power meets the power condition.

12. The power generation system according to claim 11, wherein the time is set according to an average value of the load power in each of the time periods.

13. The power generation system according to claim 8, wherein the frequency condition is a frequency at which the power load meets the power condition.

14. The power generation system according to claim 13, wherein the frequency is set according to an average value of the load power in each of the time periods.

15. The power generation system according to claim 1, wherein said power generation portion is a fuel cell configured to generate power using a fuel gas containing plenty of hydrogen and an oxidizing gas containing oxygen, said power generation system further comprising:
a fuel processor configured to generate the fuel gas through a steam reforming reaction of a hydrocarbon material and water; and
an air blower configured to supply air which is the oxidizing gas to the fuel cell.

16. A method of operating a power generation system including a power generation portion configured to generate power; and a load power detecting means configured to detect a load power which is supplied from a power source including said power generation portion to a load; comprising the steps of:
setting predetermined different stop conditions in a plurality of predetermined time periods in one day; and
stopping a power generation operation of said power generation portion based on the different stop conditions and also based on the load power detected by said load power detecting means.

* * * * *